United States Patent
Pasquier et al.

(10) Patent No.: US 10,238,966 B2
(45) Date of Patent: Mar. 26, 2019

(54) METHOD AND APPARATUS FOR ESTIMATING THE VALUE OF AN INPUT IN PRESENCE OF A NON-LINEAR FACTOR

(71) Applicant: NINTENDO CO., LIMITED, Kyoto (JP)

(72) Inventors: François-Xavier Pasquier, Paris (FR); Sébastien Guido, Paris (FR); Janos Boudet, Paris (FR)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 15/507,517

(22) PCT Filed: Aug. 27, 2015

(86) PCT No.: PCT/EP2015/069710
§ 371 (c)(1),
(2) Date: Feb. 28, 2017

(87) PCT Pub. No.: WO2016/030493
PCT Pub. Date: Mar. 3, 2016

(65) Prior Publication Data
US 2017/0282068 A1    Oct. 5, 2017

(30) Foreign Application Priority Data

Aug. 29, 2014  (EP) .................................. 14306332

(51) Int. Cl.
*A63F 13/40*  (2014.01)
*A63F 13/211*  (2014.01)
(Continued)

(52) U.S. Cl.
CPC ............ *A63F 13/40* (2014.09); *A63F 13/211* (2014.09); *A63F 13/213* (2014.09);
(Continued)

(58) Field of Classification Search
CPC ...... A63F 13/40; A63F 13/211; A63F 13/213; G06F 3/01
See application file for complete search history.

(56) References Cited

U.S. PATENT DOCUMENTS 7,698,096 B2    4/2010   Ohta
8,068,096 B2   11/2011   Taira et al.
(Continued)

FOREIGN PATENT DOCUMENTS

GB         2471905        1/2011
WO   WO 2012/156778     11/2012

OTHER PUBLICATIONS

Rahul Budhiraja, Gun A. Lee, Mark Billinghurst, Using a HHD with a HMD for Mobile AR Interaction.pdf, Extended Abstracts of the IEEE International Symposium on Mixed and Augmented Reality 2013, Science and Technology Proceedings Oct. 1-4, 2013, Adelaide, SA, Australia.*

(Continued)

*Primary Examiner* — William H McCulloch, Jr.
*Assistant Examiner* — Yingchuan Zhang
(74) *Attorney, Agent, or Firm* — Nixon & Vanderhye P.C.

(57) ABSTRACT

The present invention concerns a method and a device for estimating the value of an input in a real-time system. It concerns more particularly real time interactive systems where the input is tracked using a first sensor, typically a camera in presence of a perturbing factor. The perturbing factor is estimated using a second sensor. The component of input computed values due to the perturbing factor are cancelled based on this estimation. A next input value is then estimated from the previous computed input values where the perturbing factor has been cancelled. The estimation is then corrected by applying back the estimation of the perturbing factor.

22 Claims, 8 Drawing Sheets

(51) Int. Cl.
*A63F 13/213* (2014.01)
*G06F 3/01* (2006.01)
*H04N 13/366* (2018.01)
*A63F 13/5255* (2014.01)
*H04N 13/31* (2018.01)
*H04N 13/371* (2018.01)
*H04N 13/398* (2018.01)

(52) U.S. Cl.
CPC ............ *A63F 13/5255* (2014.09); *G06F 3/01* (2013.01); *H04N 13/366* (2018.05); *A63F 2300/1087* (2013.01); *A63F 2300/534* (2013.01); *H04N 13/31* (2018.05); *H04N 13/371* (2018.05); *H04N 13/398* (2018.05)

(56) References Cited

U.S. PATENT DOCUMENTS

| | | |
|---|---|---|
| 2002/0019258 A1 | 2/2002 | Kim et al. |
| 2007/0100666 A1 | 5/2007 | Stivoric et al. |
| 2011/0118012 A1 | 5/2011 | Ueshima |
| 2012/0007713 A1* | 1/2012 | Nasiri .................... G06F 1/1694 340/5.81 |
| 2013/0084970 A1* | 4/2013 | Geisner ................. A63F 13/216 463/29 |
| 2013/0113786 A1 | 5/2013 | King |
| 2014/0078045 A1* | 3/2014 | Yang ...................... H04N 13/31 345/156 |
| 2014/0200094 A1* | 7/2014 | Parke ...................... A63F 13/00 473/223 |
| 2014/0243093 A1* | 8/2014 | Rom ..................... A63F 13/211 463/42 |
| 2014/0364229 A1* | 12/2014 | Yamamoto ............ A63F 13/213 463/32 |
| 2016/0093107 A1* | 3/2016 | Yamamoto ............. A63F 13/92 345/633 |

OTHER PUBLICATIONS

International Search Report for PCT/EP2015/069710, dated Mar. 21, 2016, 7 pages.
Extended European Search Report dated Apr. 28, 2015, issued in corresponding European Application No. 14306332.9.
Invitation to Pay Additional Fees dated Oct. 26, 2015, issued in corresponding International Application No. PCT/EP2015/069710.

* cited by examiner

METHOD AND APPARATUS FOR ESTIMATING THE VALUE OF AN INPUT IN PRESENCE OF A NON-LINEAR FACTOR

This application is the U.S. national phase of International Application No. PCT/EP2015/069710 filed 27 Aug. 2015, which designated the U.S. and claims priority to EP Patent Application No. 14306332.9 filed 29 Aug. 2014, the entire contents of each of which are hereby incorporated by reference.

The present disclosure concerns a method and a device for estimating the value of an input in a real-time system. It concerns more particularly real time interactive systems where the input is tracked using a first sensor, typically a camera.

Real time interactive systems require both user inputs such as key press, analog input, or elsewise, and feedbacks such as display, sound, and so on. In an ideal system, the system is able to take into account user inputs instantaneously, performs instantaneous computations, and then produces outputs with zero delay. Note that user inputs do not necessarily have to be voluntary inputs. Things like face position can be monitored even though the user does not consider it per se as a user input.

In actual real-time systems the delays are never null, and the higher they tend to be, the less comfortable or natural the system will perform.

In a video game for instance, the latency between a key press or pad action and the desired on-screen effect appearing should be optimized. It is advantageous to optimize this latency in order to get the best possible user experience. Some user inputs are continuous inputs, as opposed to binary key pressed situations. This is the case of a steering wheel for example. In that case, the user cannot instantaneously set the steering wheel to a different angle, and neither can he give it an infinite rotation speed. Systems that exploit user motion (head, hand, body, etc.) measured though contactless sensors, like cameras, IR sensors, ultrasound sensors, tend to have some processing and/or filtering that introduces latency between the actual physical motion and the system awareness.

In a typical real time system, an information is captured at a given time t. From this information the system computes the value of the continuous input. Meaning that this value is available to the system at a later time. Once available, the value of this input is used to produce a feedback. When the feedback actually occurs, it is based on a value computed on information captured at time t. The latency of the system is therefore the time to compute the input plus the time to produce the feedback.

One way of improving the latency regarding continuous inputs is to consider that the input is reasonably smooth. Considering this, it may be possible to estimate a future input value using some linear prediction model. In such system, at a given time t the system computes the value of the continuous input and in the same time estimates from previous values of the input its next value at time t+1. The estimation is then used to compute the feedback function at time t+1. When the feedback occurs, it is based on an estimation of the value of this continuous input at that moment instead of a computed value of the continuous input in the past. Given that the evolution of the continuous input is reasonably linear, this estimate is likely to correspond more accurately to the actual value of the input at the time of feedback than the computed outdated value. The latency of the system has been compensated, improving the real-time experience of the user.

It may happen that the linearity of the continuous system is disrupted by some perturbing factor. In that case the estimation of the future of the continuous input based on the linear model loses its accuracy. This leads to an overall degradation of the real-time system. For example, in the detailed embodiment described below, the real-time system is a portable game console. The console is provided with a camera and a 3-D screen. For a good user experience, some parameters of the 3-D screen should be adapted based on the position of the face of the user. To achieve this adaptation, the position of the face of the user relatively to the console is tracked in real time. This position is the continuous input considered by the console system. It happens that the motion of the head of the user in front of the console is reasonably linear and therefore, this position may be estimated accurately using a linear model. But actually, the user moves the portable game console while playing. These movements happen to be much faster and less linear than the movement of the player head. These movements constitute a perturbing factor degrading the performance of the face position tracking position.

The present invention has been devised to address one or more of the foregoing concerns. It concerns the improvement of the estimation of a continuous input in a real-time system in the presence of a perturbing factor. The perturbing factor is estimated using a second sensor. The component(s) of input computed values due to the perturbing factor are cancelled based on this estimation. A next input value is then estimated from the previous computed input values where the perturbing factor has been cancelled. The estimation is then corrected by applying back the estimation of the perturbing factor.

According to a first aspect of the invention there is provided a method of estimating an input value in a real-time system, characterized in that the method comprises by a device implementing the real-time system:

computing the input value from at least a first sensor embedded in said device;

storing the computed input value in an history of computed input values on said device;

estimating a perturbing factor component of the input value from at least a second sensor embedded in said device;

determining a modified history of input values by cancelling said perturbing factor component from each input value stored in said history of computed input values;

estimating the input value from the modified history of input values.

Accordingly, the input value may be estimated independently from the perturbing factor.

In an embodiment, the method further comprises adding back the estimated perturbing factor to the estimated input value.

Accordingly, the estimated input value integrates the effect of the perturbing factor.

In an embodiment, estimating a first input value from the modified history of input values is based on a model of evolution over time of these input values.

In an embodiment, said model of evolution over time is a linear model.

In an embodiment, said estimating a first input value from the modified history consists in determining a set of coefficients to be applied to the modified history of input values using the least square method.

In an embodiment, said input is the projection of an object in front of the device in an image captured by a camera embedded in the device.

In an embodiment, said object is the eyes of a user of said device.

In an embodiment, said perturbing factor is the movement of the device.

In an embodiment, said at least one second sensor comprises at least one gyroscope.

In an embodiment, estimating a perturbing factor component of the input value comprises applying an operator doing an integration of the gyroscopes output values.

According to another aspect of the invention there is provided a method for determining a feedback in a real-time system, characterized in that the method comprises by a device implementing the real-time system: estimating an input value according to the invention; and determining the feedback based on the estimated input value.

According to another aspect of the invention there is provided a method of determining an input for adjusting a parallax barrier in a device, the method comprising:

predicting a first value for adjusting the parallax barrier at a time in the future based at least upon images captured by a camera in the device;

receiving a second value from a gyroscope in said device, the second value indicating a component of movement of the device; and cancelling the component of movement of the device from the predicted first value to determine an updated value for adjusting the parallax barrier in the device.

According to another aspect of the invention there is provided a device comprising:

a camera;
a gyroscope;
a parallax barrier;
a memory for storing executable instructions; and
a processor in communication with the memory and configured to execute the instructions, the executable instructions configured to:
  predict a first value for adjusting the parallax barrier at a time in the future based at least upon images captured by the camera in the device;
  receive a second value from the gyroscope in said device, the second value indicating a component of movement of the device; and
  cancel the component of movement of the device from the predicted first value to determine an updated value for adjusting the parallax barrier in the device.

According to another aspect of the invention there is provided a device implementing a real-time system, characterized in that it comprises for estimating an input value in the real-time system:

at least a first sensor embedded in said device;
at least a second sensor embedded in said device;
means for computing the input value from the at least first sensor;
means for storing the computed input value in an history of computed input values;
means for estimating a perturbing factor component of the input value from the at least second sensor;
means for determining a modified history of input values by cancelling said perturbing factor component from each input value stored in said history of computed input values;
means for estimating the input value from the modified history of input values.

In an embodiment, the device further comprises means for determining the feedback based on the estimated input value.

In an embodiment, said feedback is the adjustment of the parallax barrier of a 3-D screen and the input value is the position of the eyes of a user in front of said device.

According to another aspect of the invention there is provided a computer program product for a programmable apparatus, the computer program product comprising a sequence of instructions for implementing a method according to the invention, when loaded into and executed by the programmable apparatus.

According to another aspect of the invention there is provided a computer-readable storage medium storing instructions of a computer program for implementing a method according to the invention.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible, non-transitory carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

Figure 1:
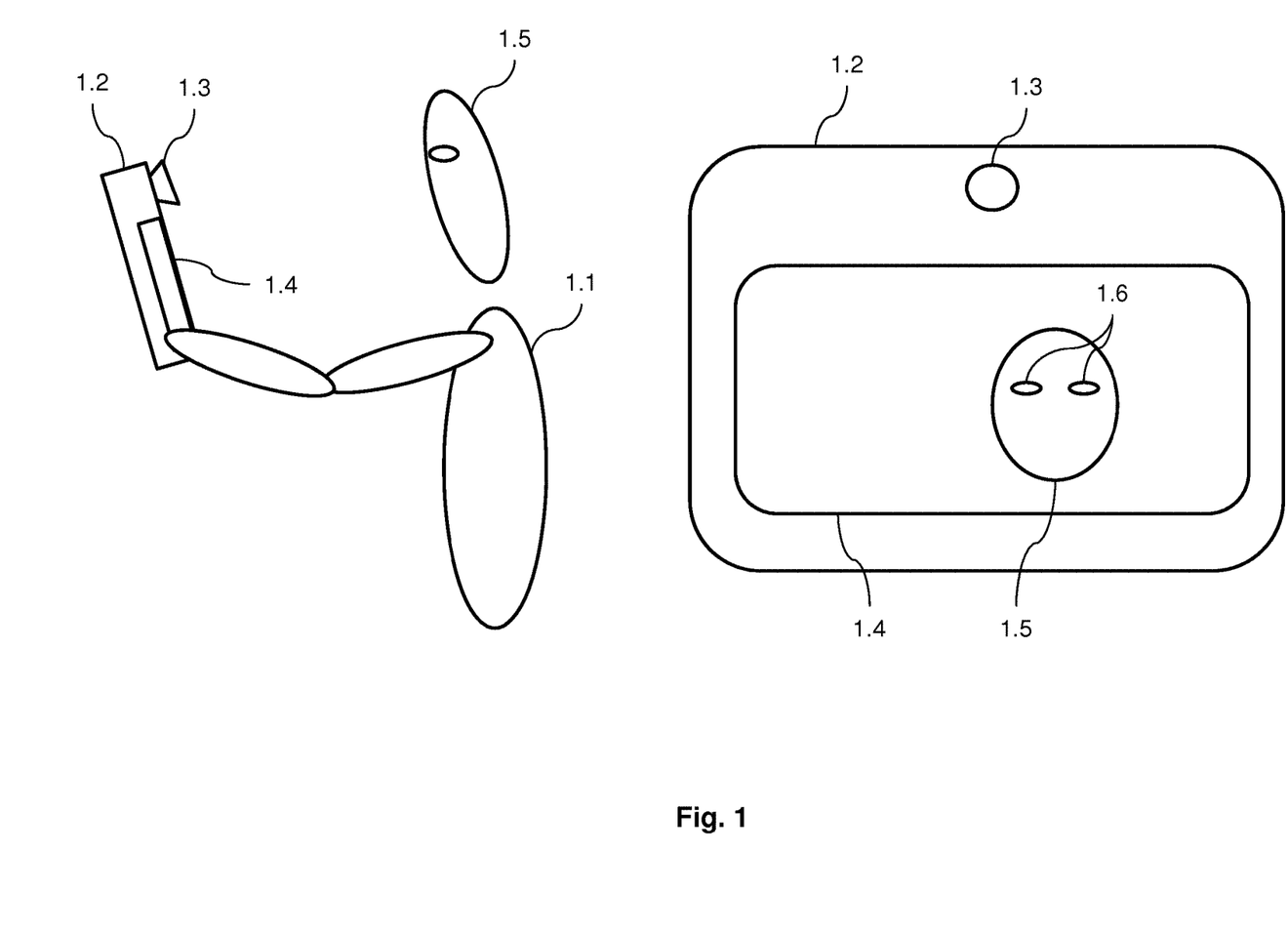
FIG. 1 illustrates the system used to describe a particular embodiment of the invention.

Embodiments of the invention will now be described, by way of example only, and with reference to the following drawings in which:

FIG. 1 illustrates the system used to describe a particular embodiment of the invention. It is worth noting that the invention is not limited to this particular system and may be applied in numerous systems involving the same problematic.

A user 1.1 is using a portable device 1.2, like a portable game console, a mobile phone, a tablet computer or others. This portable device 1.2 comprises typically a display screen 1.4 and a camera 1.3. The camera 1.3 allows taking regular pictures of the neighbourhood of the game console, typically continuous video. In a typical use case, the user 1.1 presents his head 1.5 roughly in front of the game console in order to watch the screen 1.4. This means that pictures of the head 1.5 of the user may be captured by the camera 1.3. Some well-known tracking algorithms allow tracking the head 1.5 of the user in pictures captured by the camera and particularly to identify the location of eyes 1.6 of the user in these pictures. Some examples of such tracking algorithm may be found in "Osuna, E.; Freund, R.; Girosi, F., "Training support vector machines: an application to face detection," *Computer Vision and Pattern Recognition*, 1997. Proceedings., 1997 IEEE Computer Society Conference on, vol., no., pp.130,136, 17-19Jun. 1997", in "Belhumeur, P.N.; Hespanha, J.P.; Kriegman, D., "Eigenfaces vs. Fisherfaces: recognition using class specific linear projection," *Pattern Analysis and Machine Intelligence, IEEE Transactions on*, vol.19, no .7, pp.711,720, July 1997" or in "Rowley, H.A.; Baluja, S.; Kanade, T., "Neural network-based face detection," *Pattern Analysis and Machine Intelligence, IEEE Transactions on*, vol.20, no.1, pp.23,38, January 1998".

Figure 2:
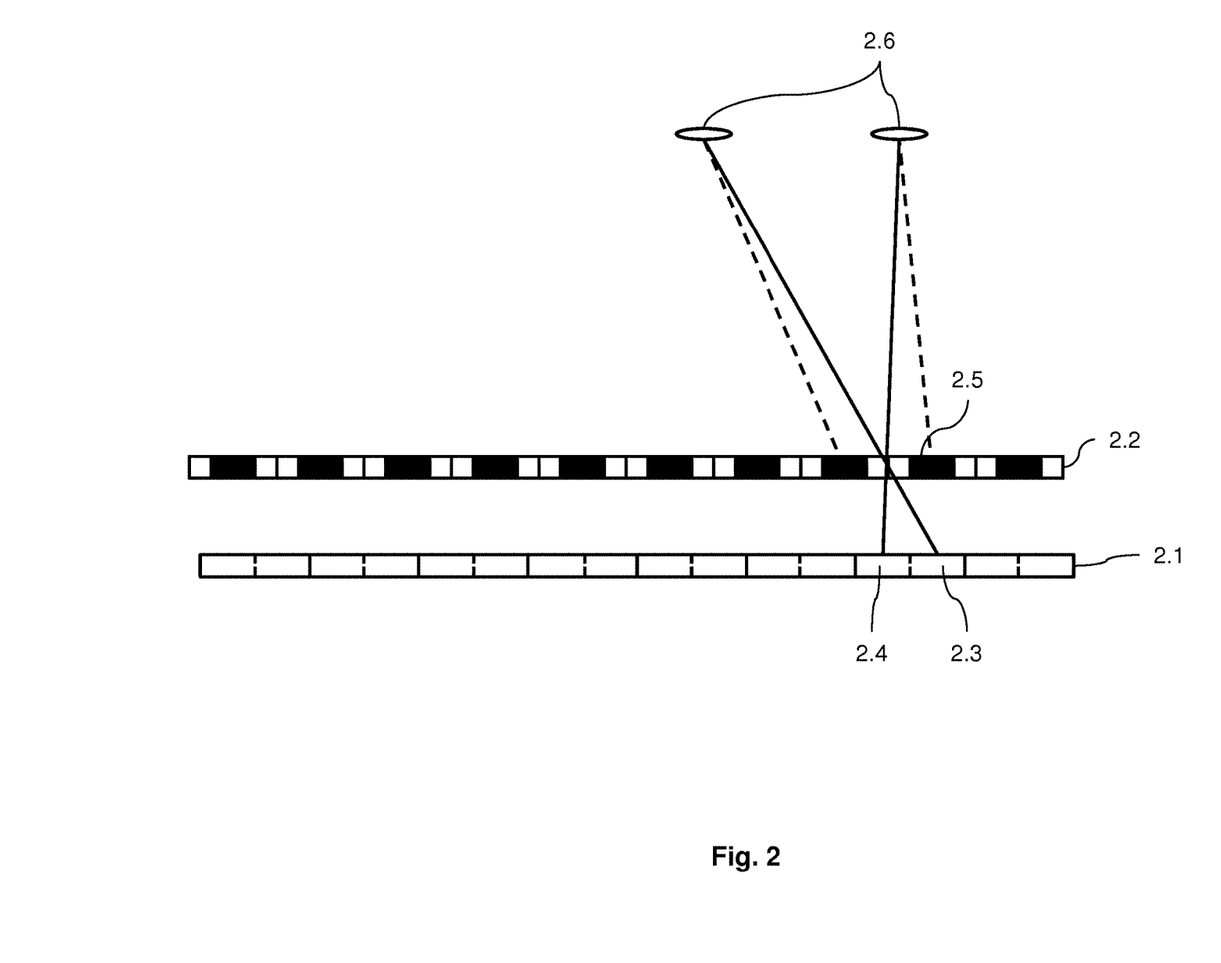
FIG. 2 illustrates the structure of a 3-D screen used in an embodiment of the invention.

In the particular embodiment herein described, the screen 1.4 is a tri dimensional stereoscopic screen. FIG. 2 illustrates the structure of this screen. The actual screen 2.1 comprises pixels divided into two parts. One part is used to display a left image to be visible by the left eye of the user while a second part is used to display a right image to be visible by the right eye of the user. In order to achieve a good stereoscopic experience, the right part of the pixel should be masked to the left eye of the user, while the left part of the pixel should be masked to the right eye of the user. Masking means 2.2 are typically provided in the screen. In our example, these masking means are made of fine stripes 2.5 that may be electronically occulted. The occulted fine stripes constitute a parallax barrier that may be displaced in front of the screen. Depending on the actual location of the eyes 2.6 of the user, the location of the barrier has to be adjusted in order to mask suitably the right part of the pixels.

In order to bring to the user a good 3-D experience, the game console is tracking in real time the location of the head of the user in pictures captured by the camera. A face tracking algorithm identifies the location of the face within the picture. It finds the location of the eyes. The central point located between the two eyes is typically taken as the reference. From the location of this central point, it may be calculated the right location of the barrier in the screen to get a right stereoscopic view for the user knowing the location of his face in the captured image.

Due to the calculation time, when the information on the location of the user's face in the captured image is known and used for the adjustment of the 3-D screen, the face may have actually moved. Namely, the adjustment is done accordingly to the position of the face at the moment of the capture and may be too late regarding the motion of the user's head.

To overcome this inconvenience, the system may compute not only the location of the user's face in the last captured picture but also a prediction of the location of the user's face in the near future. This prediction is then used for the adjustment of the 3-D screen as it is likely to correspond better at the actual location of the user's head at the moment of the adjustment.

Figure 3:
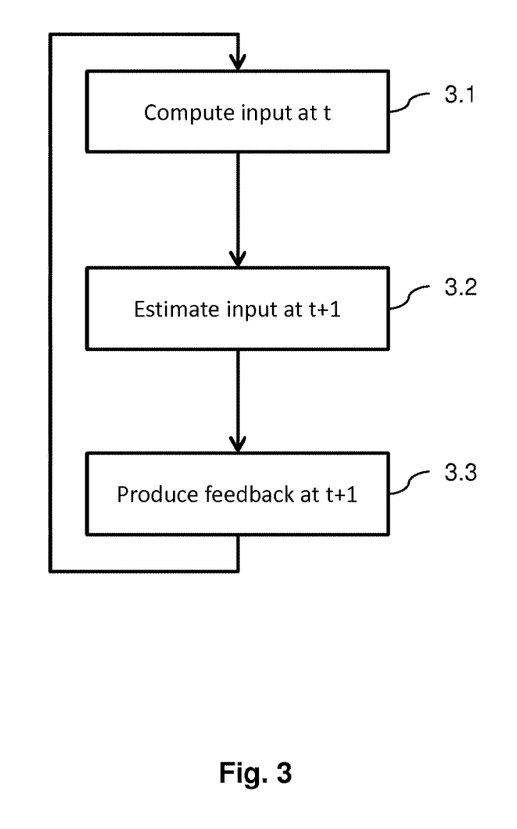
FIG. 3 illustrates the adjustment process based on prediction of the user's face location in an embodiment of the invention.

FIG. 3 illustrates the adjustment process based on prediction of the user's face location.

At a given moment t, in a step 3.1, the device computes the input. In our embodiment the input corresponds to the eyes location of the user's face. This computed input is stored in a history of the input values over time.

Next, in a step 3.2, an estimate of the value of the input at a time t+1 in the near future is computed. This estimation is made from the stored history of input values, for example by using a model of evolution of these values. This model is typically linear as will be detailed below.

Next, in a step 3.3, the device produces the feedback at time t+1 . In our example, the feedback corresponds to the adjustment of the barrier of the 3-D screen. This feedback is computed based on the estimation of the input at that exact time t+1, and not the exact value of the input computed in the past at time t.

Assuming that the prediction is accurate, the feedback fits exactly the estimation of the input giving to the user a great real-time experience with no latency. The accuracy of the prediction depends on the accuracy of the model. In our case, it depends, inter alia, on the smoothness of the motion of the user's head.

The linear adaptive prediction is a common way to build an accurate prediction over a history of previous positions. It consists of trying to find a set of coefficients-or weights-to predict the next position based on current history. Those coefficients are determined such that they minimize the error of prediction versus reality. There are at least two ways of resolving the problem. A first solution is a least squares method. A second solution is a Broyden's like method.

The least square method is a standard approach to solve this kind of linear problem with the advantage that its resolution is a closed form formula. The drawback is that the matrix inversion can fail if the history lacks variance, namely a case of degeneration.

By comparison, the other approach inspired by Broyden's method is an iterative process without the risk of degeneration. This approach tries to minimize the prediction error by applying the minimal modification to the coefficients. The minimal modification is defined in the sense of minimizing the square norm of the two set of coefficients. References on Broyden's method may be found in "C. G. Broyden. On the discovery of the "good Broyden" method. Math. Program., 87(2, Ser. B):209-213, 2000. Studies in algorithmic optimization".

Figure 4:
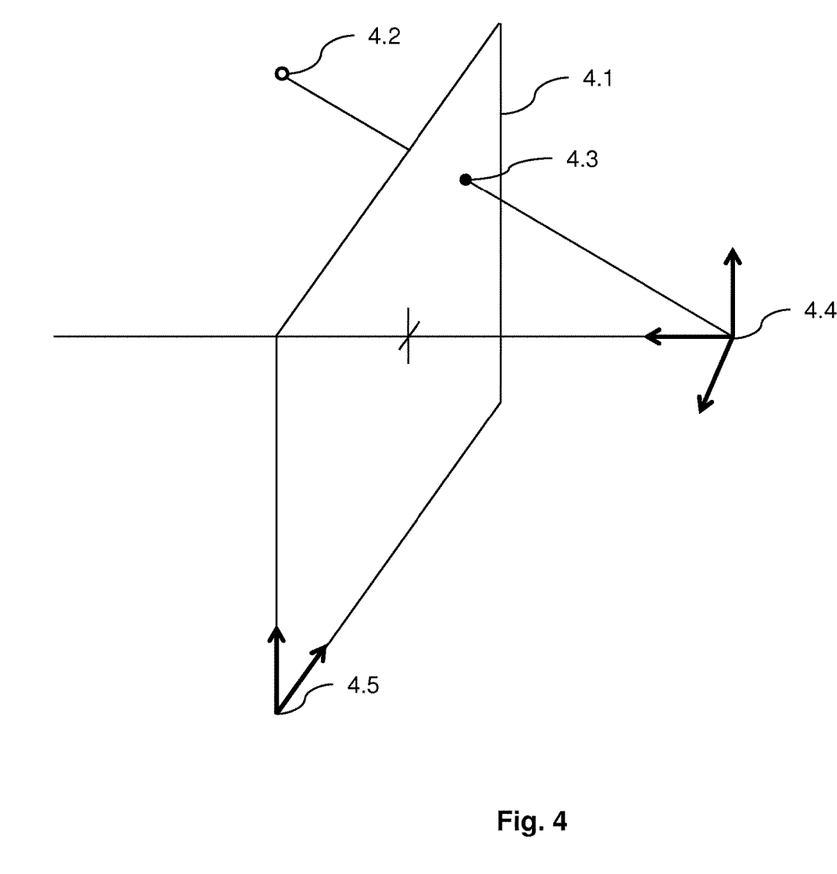
FIG. 4 illustrates the least square method used in an embodiment of the invention.

The least square method works as follows in reference to FIG. 4. We consider a 3-D basis 4.4 linked to the device. It is worth noting that we consider here that the device does not move within the world, meaning that the bases 4.4 may also be considered as a basis for the world.

An object 4.2 in the world is projected in a screen space 4.1 having its own basis 4.5, namely a basis $(\vec{u},\vec{v})$. The projection of the object 4.2 is the point 4.3 in the image basis. The projection operator is the camera. In other words, the point 4.3 is the location in the captured picture at a given time t of the object 4.2.

In our example, the object 4.2 is the user's face and more precisely the reference point between his eyes while the projection 4.3 is the location in a captured picture of this point in the screen space.

Let $x_i$ be the absolute object position relatively to the device, in a screen space projection, at time i. We have a history $P_i$ of n previous positions, and n coefficients C, defined as such:

$P_i = [x_{i-n} \ldots x_{i-4} \ x_{i-3} \ x_{i-2} \ x_{i-1}]$ $C = [c_n \ldots c_4 \ c_3 \ c_2 \ c_1]$ The problem to be solved is to estimate a new position $\hat{x}_i$ of the object at time i based on the history $P_i$.

Based on a linear model, the estimated position $\hat{x}_i$ is given by:

$$\hat{x}_i = \sum_{k=1}^{n}(x_{i-k}c_k) = P_i \cdot C$$

The problem is therefore to compute the coefficients C given the full history of positions $P_\infty$ the vector C is defined by the set of coefficients that "best predicts" all positions of $P_\infty$. So C minimizes the quadratic error of prediction over whole history:

$$C, \min \sum_{k}^{\infty}\left[\left(x_{k_{predicted}} - x_k\right)^2\right]$$

Here we describe the resolution of the quadratic minimization over n positions:

$$C, \min \sum_{i=0}^{n}\left[\left(x_{i_{predicted}} - x_i\right)^2\right]$$

$$\min \sum_{i=0}^{n}[(P_iC - x_i)^2]$$

To find the minimum of this function, we must cancel out the partial derivative with respect to C.

$$\frac{\partial}{\partial C}\left(\sum_{i=0}^{n}[(P_iC - x_i)^2]\right) = \sum_{i=0}^{n}[(2P_iP_i^TC - 2P_ix_i)] = 0$$

$$\sum_{i=0}^{n}[P_iP_i^T]C - \sum_{i=0}^{n}[P_ix_i] = 0$$

Let $Q_n$ and $V_n$ be defined by:

$$Q_n = \sum_{i=0}^{n}[P_iP_i^T], \quad V_n = \sum_{i=0}^{n}[P_ix_i]$$

We obtain the following equality: $Q_nC - V_n = 0$
The set of coefficient C is defined by: $C = (Q_n)^{-1}V_n$ Based on the recent history, we can compute the best underlying model that "explains" this history, and then use this model to predict a new position.

Advantageously, the model is updated to take into account each newly computed position as given by the face tracking algorithm.

Assuming a fixed device, this method gives satisfactory results. The motion of the user's head happens to be smooth enough to allow a good prediction and therefore a good 3-D experience to the user. Unfortunately, in the context of a handheld device, the user imparts some additional motion to the device itself while playing. For example, when pressing the keypad, the user tends to move the device. These movements tend to perturb the otherwise linearly predictable motion of the user's head. Motion of the device generates some strong acceleration to the apparent motion of the object as projected in the screen space.

When reasoning in the device space, the motion of the object in the device space may be interpreted as the result of the combination of two movements. A first movement corresponds to the movement of the object in the world which is combined with the movement of the world in the device space. It is worth noting that the movement of the world in the device space is actually a movement of the device within the world. But as the computations and the projection of the object in the screen space occur in the device space, we consider the movement of the world in the device space. This may be summarized by the following formula:

$$M_{O/D}M_{O/W}\circ M_{W/D}$$

Where $M_{O/D}$ represents the movement of the object in the device space, $M_{O/W}$ represents the movement of the object in the world, and $M_{W/D}$ represents the movement of the world in the device space.

While the movement of the object, here the user's head, in the world is quite smooth and therefore predictable with a good accuracy by a linear model, the movement of the world in the device space is much more erratic. It acts as a perturbing factor degrading the accuracy of the prediction. The problem is therefore how to deal with this perturbing factor to improve the accuracy of the prediction of the user's head movement.

The proposed solution is to take advantage of built in sensors in the device to get knowledge of the movement of the world. By being able to estimate this movement of the world in the device space, this component may be separated from the movement of the object in the world that can then be accurately predicted. These sensors may be of different types comprising but not limited to gyroscopes, accelerometers, cameras, compass, telemeters, IR sensors, pressure sensors, etc. . . . . Actually, any sensor that may give some information on the movement of the device may be used. In our detailed embodiment the sensor used is a gyroscope.

The internal sensors of the handheld device give information about the movement of the device with respect to the world. This information may be used to estimate the movement of the projection of the object in the screen space induced by the movement of the device in the world.

Figures 5A, 5B:
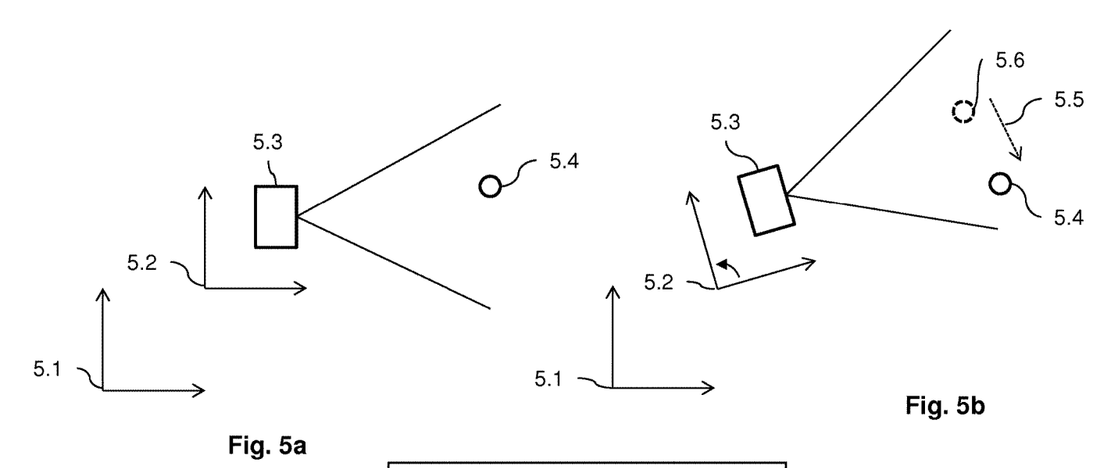
FIGS. 5a, 5b and 5c illustrates the movement of an object due to the movement of the device in an embodiment of the invention.
Figure 5C:
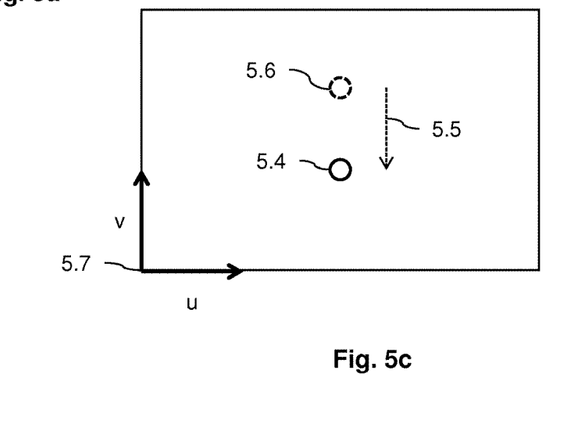

FIGS. 5a, 5b and 5c illustrate the movement in the device space 5.2 and in the screen space 5.7 of an object 5.4 induced by the movement of the device 5.3 relative to the world space 5.1. In FIGS. 5b and 5c the dotted object 5.6 illustrates the former position of the object 5.4 in the device or screen space.

The arrow 5.5 illustrates the apparent movement of the object 5.4 in the device or screen space. In this example, the object 5.4 is considered as fixed in the world space 5.1.

Figure 6:
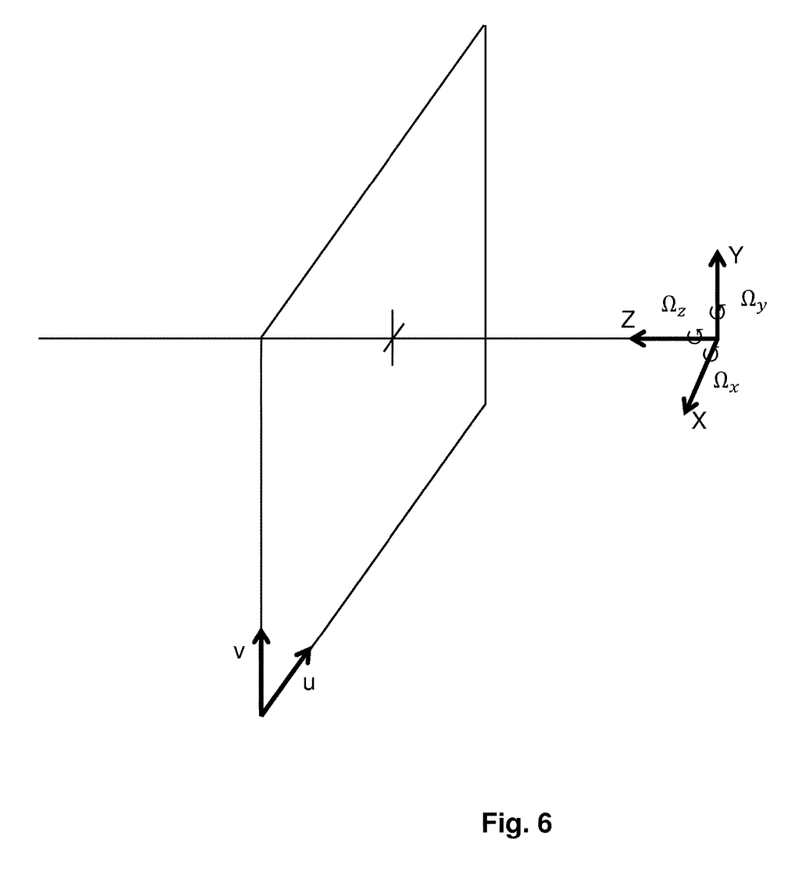
FIG. 6 illustrates rotations as given by embedded gyroscopes relatively to the three rotation axes in an embodiment of the invention.

FIG. 6 illustrates rotations as given by embedded gyroscopes relatively to the three rotation axes X, Y, Z of the device space. It is worth noting that outputs of gyroscopes $\Omega_x, \Omega_y, \Omega_z$ do not correspond exactly to the rotations values. Actual rotations may be obtained by applying some gains to these outputs. Namely, the actual rotations correspond to $\Omega \cdot K$, where:

$$\Omega = \begin{bmatrix} \Omega_x \\ \Omega_y \\ \Omega_z \end{bmatrix} \text{ and } K = \begin{bmatrix} K_x \\ K_y \\ K_z \end{bmatrix},$$

$\Omega$ being the outputs of gyroscopes and K the gains. The values of these gains may be known from the manufacturer of the gyroscopes or obtained by calibration.

Let's define $U_k$ as the suite of positions of the projection in the screen space of a fixed point. As the point is considered fixed in the world, the movement of the projection point $U_k$ in the screen space is only due to the device movement in the world. An estimate $\hat{U}_{k+1}$ of the next position of this projection point may be computed as follows considering a small angle variation approximation:

$$\hat{U}_{k+1} = \begin{bmatrix} u_{k+1} \\ v_{k+1} \end{bmatrix}_{estimate} = \begin{bmatrix} u_k \\ v_k \end{bmatrix} + K_z \Omega_{z_k} \begin{bmatrix} v_k \\ -u_k \end{bmatrix} + \begin{bmatrix} K_y \Omega_{y_k} \\ K_x \Omega_{x_k} \end{bmatrix}$$

where:

$$U_k = \begin{bmatrix} u_k \\ v_k \end{bmatrix}, \quad \Omega_k = \begin{bmatrix} \Omega_{x_k} \\ \Omega_{y_k} \\ \Omega_{z_k} \end{bmatrix}, \quad K = \begin{bmatrix} K_x \\ K_y \\ K_z \end{bmatrix}$$

or alternatively:

$$\hat{U}_{k+1} = U_k + M_k K, \text{ with } M_k = \begin{bmatrix} 0 & \Omega_{y_k} & v_k \Omega_{z_k} \\ \Omega_{x_k} & 0 & -u_k \Omega_{z_k} \end{bmatrix}$$

This computation allows representing in screen space the movement of a fixed object in the world, when the device moves with respect to the world, provided that the gains (K) are correct. In a real system, gains are specified by the constructor, but are never completely accurate, nor are we protected against drifting sensors values.

Based on these results, we now introduce a new model merging sensors inputs with prediction. This new model improves the accuracy of the prediction by bringing robustness to device movements. This model also proves to be robust to non-perfectly calibrated sensors.

We consider the context of an object moving in the world. This object position being captured by a first sensor linked to a mobile device, typically a camera. The mobile device moves itself in the world. As previously, we are interested in predicting the movement of the object relatively to the mobile device. More precisely, we are interested in the movement of the projection of the object into a screen space linked to the mobile device. The projection is the operation of capturing successive pictures by the camera.

Figure 7:
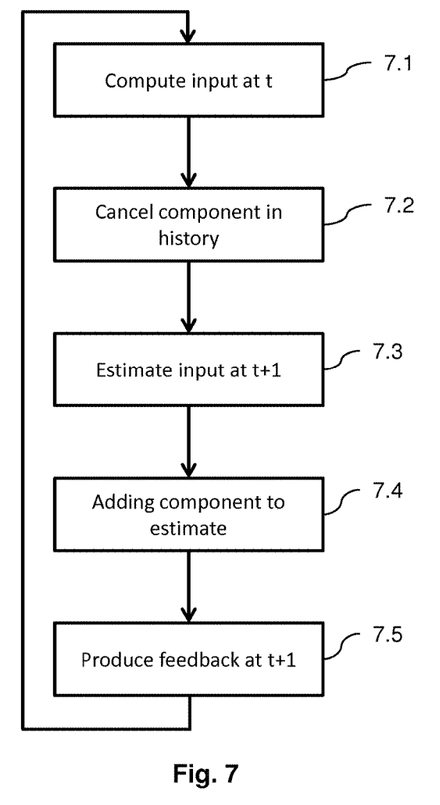
FIG. 7 illustrates the steps of the general method according to an embodiment of the invention to predict an input in presence of a perturbing factor.

FIG. 7 illustrates the steps of the general method according to an embodiment of the invention to predict an input in presence of a perturbing factor.

At a given moment t, in a step 7.1, the device computes the input from a first sensor. In our embodiment the input corresponds to the eyes location of the user's face. This computed input is stored in a history of the input values over time.

In a step 7.2, the perturbing component is canceled from the values stored in the history. This is done by estimating the component of the inputs due to the perturbing factor. This estimation is done typically based on at least a second sensor. Each value stored in the history is modified by suppressing the perturbing factor effect.

Next, in a step 7.3, a first estimate of the value of the input at a time t+1 in the near future is computed. This estimation is made from the modified history of input values using a model of evolution of these values. This estimation is therefore done as if the perturbing factor would not be present.

In a step 7.4, an estimation of the effect of the perturbing factor as estimated from the second sensor is added to the first estimate of the input. This allows reintroducing the effect of the perturbing factor in the estimate of the input to get an accurate estimation of the future input in presence of the perturbing factor. This step may be optional considering that in some embodiment we might be interested in the estimation of the input value independently from the perturbing factor.

This accurate estimation is used in step 7.5 to produce the feedback at that exact time t+1.

Accordingly, the estimate of the input is based on a linear estimation of this input as it would be without the perturbing factor. The effect of this perturbing factor is reintroduced afterward to get the final estimation of the input. The effect of the perturbing factor on the linear estimation is cancelled. The estimation is no more degraded by the non-linearity of the perturbing factor.

In our detailed embodiment, as previously, a history of all computed positions of the object in the screen space is stored:

$P_i = [x_{i-n} \ x_{i-4} \ x_{i-3} \ x_{i-2} \ x_{i-1}]$.

Our goal is still to estimate a next position $\hat{x}_i$ of the projection of the object in the screen space given that the movement of the object is due to its own movement in the world space combined with movement of the device itself in the world space. Referring to the device space, the movement of the device in the world may be seen as a movement of the world relatively to the device space.

One aspect is to cancel the component of the movement due to the movement of the world in the history of positions stored $P_i$. This may be viewed as freezing the device at the last position relatively to the world, namely at the position of the device at the time $x_{i-1}$ is computed and to modify all positions stored in the history to where it would have been if the device had had this fixed position when all positions have been computed.

To do so, a system transformation operator $ST_n(x)$ is defined as follow:

$$ST_n(U_k) = U'_k - U_k = \sum_{i=0}^{n-1} M_{k+i} K,$$

$$\text{with } M_k = \begin{bmatrix} 0 & \Omega_{y_k} & v_k \Omega_{z_k} \\ \Omega_{x_k} & 0 & -u_k \Omega_{z_k} \end{bmatrix}$$

$$U'_k = U_k + ST_n(U_k)$$

$$ST_0(x) = 0$$

Where $U_k = (u_k, v_k)$ corresponds to one position $x_i$ in the history of the projection point in the screen space. $U'_k = (u'_k, v'_k)$ is the modified position the projection point would have occupied if the device had been fixed in the world. $\Omega_k$ has the same definition as given above. n represents the number of step to be applied. It is a rank in the history, the number of times the device has moved since the capture of the input. This operator operates by doing an integration of the gyroscopes output values. It gives us the movement of the world relatively to the device space n steps of computation backward.

It comes that to modify the history of position to get rid of the movement of the device, the system transformation operator $ST_n(x)$ is applied to each position in the history. The result is a modified history $P'_i$ representing what the history would have been if the device had been fixed in the world:

$$P'_i = P_i + ST(P_i)$$

where:

$ST(P_i) = [ST_{n-1}(x_{i-n})\ ST_3(x_{i-4})\ ST_2(x_{i-3})\ ST_1(x_{i-2})\ ST_0(x_{i-1})]$

It is worth noting that for the most recent position $x_{i-1}$, $P'_i$ and $P_i$ are equal. This is due to the fact that the position of the device has been frozen to correspond to the last position.

The prediction of the next position $\widehat{x'}_i$ at time i representing the estimation of the position in the screen space of the projection of the object without taking into account the movement of the device is now computed based on $P'_i$. This computation is the same as the one described in the foregoing.

$$\widehat{x'}_i = P'_i \cdot C$$

Where C is calculated with the same quadratic minimization method:

$$C, \min \sum_k^\infty \left[ (x_{k_{predicted}} - x_k)^2 \right]$$

$$C = (Q_n)^{-1} V_n, \text{ with } Q_n = \sum_{i=0}^n [P'_i P_i'^T],\ V_n = \sum_{i=0}^n [P'_i x_i]$$

Once the position of the projection of the object in the screen space, not taking into account the perturbing factor constituted by the movement of the device in the world, has been estimated, the latter has to be reintroduced to get the final prediction of the position $\hat{x}_i$.

$$\hat{x}_i = \widehat{x'}_i + ST_1(x_{i-1})$$

It is worth noting that the gains K of the gyroscopes are not used in the definition of the operator ST used to estimate the movement of the device in the world from the gyroscopes inputs. This is one of the further advantages of the proposed method that it does not need the sensors to be perfectly calibrated. The reason is that inaccuracy introduced in the estimation of the movement of the device in the world due to a poor calibration of the gyroscopes may be compensated by the linear prediction of the movement. Of course, a poor calibration leads to a poor estimation of the movement of the device, which leads to a poor cancellation of this movement and eventually to a greater part of it remaining in the linear part to be compensated by the linear prediction. At some extent this will lead to a degradation of the accuracy of the linear prediction. It is therefore advantageous to work with close to perfectly calibrated gyroscopes. Nevertheless, the proposed method is robust to some inaccuracy in the calibration of the sensors. Practically, there is no need to implement some regular calibration steps to take into account possible drifts in the results given by the sensors.

Accordingly the proposed method allows estimating a prediction of the next position of the projection of the object in the screen space. Namely, the position of the eyes of the user in front of the device may be tracked. The next position may be estimated in order to adjust the parallax barrier of a 3-D screen accordingly.

While being described in relation to the tracking of a user's face by a camera in presence of a perturbing factor constituted by the movement of the device, the same method may apply in different context. As soon as an input in a real-time system may be used to produce a feedback and where the linear evolution of the input is perturbed by a factor, the method may be applied similarly.

Figure 8:
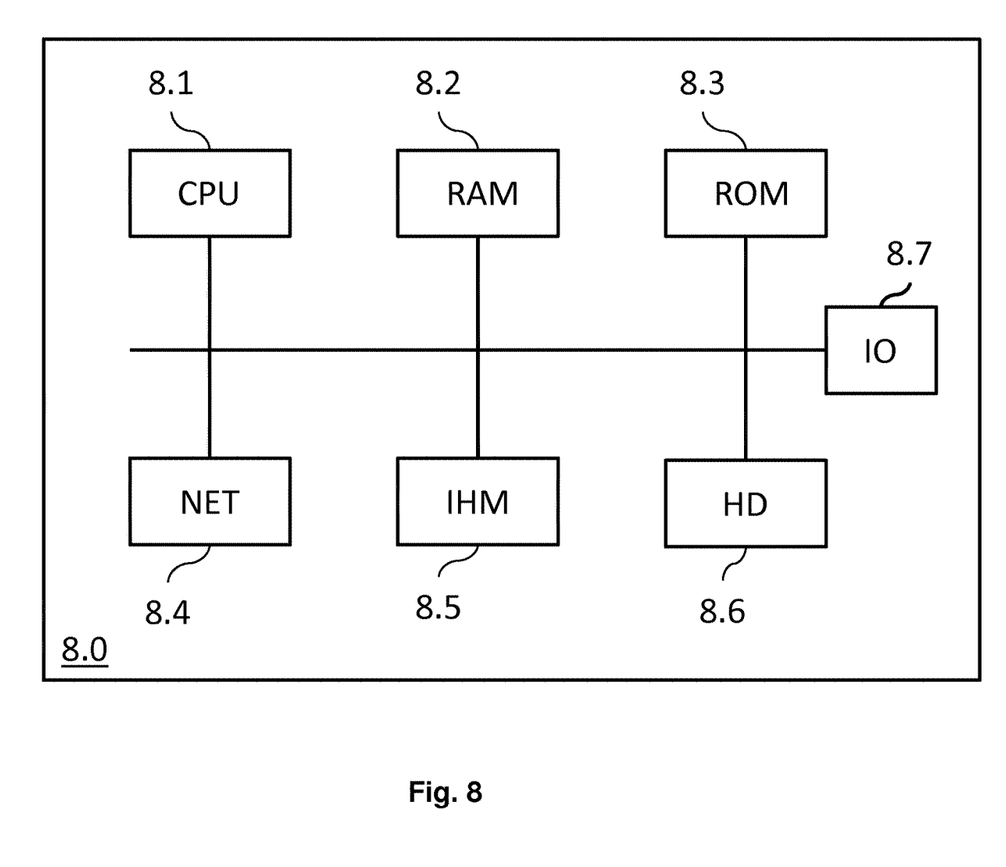
FIG. 8 is a schematic block diagram of a computing device for implementation of one or more embodiments of the invention.

FIG. 8 is a schematic block diagram of a computing device 8.0 for implementation of one or more embodiments of the invention. The computing device 8.0 may be a device such as a micro-computer, a workstation or a light portable device. The computing device 8.0 comprises a communication bus connected to:

a central processing unit 8.1, such as a microprocessor, denoted CPU;
  a random access memory 8.2, denoted RAM, for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example;
  a read only memory 8.3, denoted ROM, for storing computer programs for implementing embodiments of the invention;
  a network interface 8.4 is typically connected to a communication network over which digital data to be processed are transmitted or received. The network interface 8.4 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 8.1;
  a user interface 8.5 may be used for receiving inputs from a user or to display information to a user;
  a hard disk 8.6 denoted HD may be provided as a mass storage device;
  an I/O module 8.7 may be used for receiving/sending data from/to external devices such as a video source or display.

The executable code may be stored either in read only memory 8.3, on the hard disk 8.6 or on a removable digital medium such as for example a disk. According to a variant, the executable code of the programs can be received by means of a communication network, via the network interface 8.4, in order to be stored in one of the storage means of the communication device 8.0, such as the hard disk 8.6, before being executed.

The central processing unit 8.1 is adapted to control and direct the execution of the instructions or portions of software code of the program or programs according to embodiments of the invention, which instructions are stored in one of the aforementioned storage means. After powering on, the CPU 8.1 is capable of executing instructions from main RAM memory 8.2 relating to a software application after those instructions have been loaded from the program ROM 8.3 or the hard-disc (HD) 8.6 for example. Such a software application, when executed by the CPU 8.1, causes the steps of the flowcharts shown in FIG. 7 to be performed.

Any step of the algorithm shown in FIG. 7 may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of estimating an input value in a real-time system, wherein the method comprises by a handheld device implementing the real-time system:
   computing the input value from at least a first sensor disposed in or on said handheld device, the computed input value indicating a position of at least part of a head relative to the handheld device;
   storing the computed input value in an history of computed input values;
   using at least a second sensor disposed in or on said handheld device to sense hand movement of said handheld device;
   estimating a non-linear perturbing factor component of the input value from the hand movement the at least second sensor senses;
   determining a modified history of input values by cancelling said non-linear perturbing factor component from input values stored in said history of computed input values to thereby correct for hand movement; and
   estimating the position of the at least part of the head relative to the handheld device from the modified history of input values.

2. The method of claim 1, further comprising adding back the estimated non-linear perturbing factor to the estimated position.

3. The method of claim 1, wherein estimating position from the modified history of input values is based on a model of evolution over time of the input values.

4. The method of claim 3, wherein said model of evolution over time comprises a linear model.

5. The method of claim 4, wherein said estimating position from the modified history comprises determining a set of coefficients to be applied to the modified history of input values using the least square method.

6. The method according to claim 1, wherein said input value specifies a projection of at least a part of the head in front of the handheld device in an image captured by a camera embedded in the handheld device, the camera comprising the first sensor.

7. The method according to claim 6, wherein said at least a part of the head comprises at least one eye of the user of said handheld device.

8. The method of claim 1, wherein said at least a second sensor comprises at least one gyroscope providing output values.

9. The method of claim 8, wherein estimating a non-linear perturbing factor component of the input value comprises:
   integrating output values of the gyroscope.

10. The method of claim 1, wherein estimating the position comprises tracking the position of the portion of the head relative to the handheld device with the determined modified history of input values, correcting the tracked position for hand movement, and based on the corrected tracked position, predicting a new position of the portion of the head.

11. A method for determining a feedback in a real-time system, wherein the method comprises by a handheld device implementing the real-time system:
   computing the input value from at least a first sensor disposed in or on said handheld device, the at least first sensor sensing at least part of a head relative to the handheld device;
   storing the computed input value in an history of computed input values;
   using at least a second sensor disposed in or on said handheld device to sense hand movement of said handheld device;
   estimating a non-linear factor component of the input value from the hand movement the at least second sensor senses;
   determining a modified history of input values by cancelling said non-linear factor component from input values stored in said history of computed input values to correct the history of computed input values for sensed hand movement;
   estimating the position of the at least part of a head relative to the handheld device from the modified history of input values; and
   determining the feedback based on the estimated position.

12. The method of claim 11, wherein the feedback is an estimation of a next position of a user's eyes in front of the device, the device comprising a three-dimensional screen that displays three-dimensional stereoscopic images using a parallax barrier, the method further comprising adjusting the parallax barrier based on the estimated next position of the user's eyes.

13. A method of determining an input for adjusting a parallax barrier of a handheld device, the method comprising:
   predicting a first value for adjusting the parallax barrier at a time in the future based at least upon images captured by a camera in the handheld device;
   receiving a second value from a gyroscope in said handheld device, the second value indicating at least a component of hand movement of the handheld device; and
   wherein predicting the first value includes cancelling the component of hand movement of the handheld device from the predicted first value to determine an updated value for adjusting the parallax barrier in the handheld device.

14. A device for estimating an input value in a real-time system, the input value indicative of position of at least a portion of a head relative to the handheld device, the handheld device comprising:
   at least a first sensor embedded in said handheld device;
   at least a second sensor embedded in said handheld device;
   at least one processor, operatively connected to the first sensor, configured to compute the input value from the at least first sensor;

a storage device, operatively connected to the at least one processor, for storing the computed input value in an history of computed input values;

the at least one processor being further configured to:

determine, using the at least second sensor, hand movement of said handheld device;

estimate a non-linear perturbing factor component of the input value from the determined hand movement;

determine a modified history of input values by cancelling said estimated non-linear perturbing factor component from each input value stored in said history of computed input values to thereby correct for hand movement; and estimate the input value from the modified history of input values.

15. The device of claim 14, wherein the at least one processor is further configured to determine feedback based on the estimated input value.

16. The device of claim 15, wherein said feedback comprises the adjustment of the parallax barrier of a 3-D screen and the input value is the position of the eyes of a user in front of said device.

17. A non-transitory storage device storing a computer program product for a programmable apparatus, the computer program product comprising a sequence of instructions for implementing a method, when loaded into and executed by the programmable apparatus, of estimating an input value in a real-time system comprising:

computing the input value from at least a first sensor disposed in or on a handheld device, the input value indicating position of at least part of a head relative to the handheld device;

storing the computed input value in an history of computed input values on said handheld device;

using at least a second sensor disposed in or on said handheld device to sense hand motion of said handheld device;

estimating a non-linear factor component of the input value from at least the hand motion the at least second sensor senses;

determining a modified history of input values by cancelling said non-linear factor component from input values stored in said history of computed input values to thereby correct for hand motion; and estimating the input value from the modified history of input values.

18. A handheld device for estimating an input value in a real-time system, the handheld device comprising:

at least a first sensor embedded in said handheld device;

at least a second sensor embedded in said handheld device;

at least one storage device; and at least one processor operatively connected to the at least first and second sensors and the at least one storage device, the at least one processor executing instructions that control the at least one processor to:

compute the input value from the at least first sensor, the input value indicating position of at least part of a head relative to the handheld device;

store, into the at least one storage device, the computed input value in an history of computed input values;

use at least a second sensor disposed in or on said handheld device to sense hand motion of said handheld device;

estimate a non-linear factor component of the input value from the hand motion the at least second sensor senses;

determine a modified history of input values by cancelling said non-linear factor component from each input value stored in said history of computed input values to thereby correct for hand motion; and estimate the input value from the modified history of input values.

19. The device of claim 18, wherein the at least one processor executes further instructions controlling the at least one processor to determine feedback based on the estimated input value.

20. The device of claim 19, wherein the device further comprises a stereoscopic display having a parallax barrier, said feedback comprises adjusting the parallax barrier of the stereoscopic display, and the input value indicates the position of the eyes of a user relative to the stereoscopic display.

21. The device of claim 19 wherein the first sensor comprises an image sensor configured to sense position of at least a part of a user's face relative to the device, and the second sensor comprises an inertial sensor that is configured to sense how sensing by the image sensor is perturbed by the user's hand movement of the device.

22. A handheld stereoscopic display device comprising:

a multi-dimensional tracking sensor producing a tracking signal;

an inertial sensor;

a memory storing program instructions;

a stereoscopic display having an adjustable parallax barrier; and a processor connected to the tracking sensor, the inertial sensor, the memory and the stereoscopic display, the processor executing the program instructions to perform the following:

(a) tracking a part of a user's head in response to a succession of tracking signals;

(b) correcting the tracking for hand movement the inertial sensor senses;

(c) predicting a prospective position of the part of the user's head in response to the corrected tracking; and (d) adjusting the stereoscopic display parallax barrier based on the predicted prospective position.

* * * * *